(12) United States Patent
Kasseris et al.

(10) Patent No.: US 8,353,269 B2
(45) Date of Patent: Jan. 15, 2013

(54) SPARK IGNITION ENGINE THAT USES INTAKE PORT INJECTION OF ALCOHOL TO EXTEND KNOCK LIMITS

(75) Inventors: Emmanouil Kasseris, Cambridge, MA (US); John B. Heywood, Newtonville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 162 days.

(21) Appl. No.: 12/942,133

(22) Filed: Nov. 9, 2010

(65) Prior Publication Data

US 2011/0067674 A1 Mar. 24, 2011

Related U.S. Application Data

(63) Continuation-in-part of application No. 12/730,662, filed on Mar. 24, 2010, now abandoned, which is a continuation of application No. 11/840,719, filed on Aug. 17, 2007, now Pat. No. 7,740,004, which is a continuation of application No. 10/991,774, filed on Nov. 18, 2004, now Pat. No. 7,314,033.

(51) Int. Cl.
*F02M 25/00* (2006.01)

(52) U.S. Cl. ........ 123/198 A; 123/2

(58) Field of Classification Search ........ 123/198 A
See application file for complete search history.

(56) References Cited

U.S. PATENT DOCUMENTS

| | | | |
|---|---|---|---|
| 2,741,230 A | 4/1956 | Reynolds | |
| 3,089,470 A | 5/1963 | Payne | |
| 3,106,194 A | 10/1963 | Cantwell et al. | |
| 3,557,763 A | 1/1971 | Probst | |
| 3,822,119 A * | 7/1974 | Frech et al. | ........ 44/451 |
| 4,031,864 A | 6/1977 | Crothers | |
| 4,056,087 A | 11/1977 | Boyce | |
| 4,182,278 A | 1/1980 | Coakwell | |
| 4,230,072 A | 10/1980 | Noguchi et al. | |
| 4,312,310 A | 1/1982 | Chivilo et al. | |
| 4,402,296 A | 9/1983 | Schwarz | |
| 4,480,616 A | 11/1984 | Takeda | |
| 4,541,383 A | 9/1985 | Jessel | |
| 4,594,201 A | 6/1986 | Phillips et al. | |
| 4,596,277 A | 6/1986 | Djordjevic | |
| 4,721,081 A | 1/1988 | Krauja et al. | |
| 4,876,988 A * | 10/1989 | Paul et al. | ........ 123/1 A |
| 4,958,598 A | 9/1990 | Fosseen | |
| 4,967,714 A | 11/1990 | Inoue | |

(Continued)

OTHER PUBLICATIONS

The International Search Report and Written Opinion issued in connection with International Patent Application No. PCT/US2011/059911 mailed on Feb. 6, 2012.

(Continued)

*Primary Examiner* — Noah Kamen
*Assistant Examiner* — Grant Moubry
(74) *Attorney, Agent, or Firm* — Sam Pasternack; MIT Technology Licensing Office

(57) ABSTRACT

Internal combustion engine system. The system includes a source of gasoline for direct injection into cylinders of a spark ignition engine along with a source of an antiknock fuel for injection into the intake ports of the engine as needed to prevent knock. A preferred antiknock fuel is ethanol or an ethanol/gasoline blend having an ethanol content of 20% by volume or more. Other suitable antiknock fuels are methanol, a combination of ethanol and methanol, and a blend of gasoline with either ethanol, methanol, or an ethanol/methanol mixture.

21 Claims, 2 Drawing Sheets

U.S. PATENT DOCUMENTS

| | | | |
|---|---|---|---|
| 4,974,416 A | 12/1990 | Taylor | |
| 4,993,386 A | 2/1991 | Ozasa et al. | |
| 5,179,923 A | 1/1993 | Tsurutani et al. | |
| 5,233,944 A | 8/1993 | Mochizuki | |
| 5,497,744 A | 3/1996 | Nagaosa et al. | |
| 5,560,344 A | 10/1996 | Chan | |
| 5,715,788 A | 2/1998 | Tarr et al. | |
| 5,911,210 A | 6/1999 | Flach | |
| 5,937,799 A | 8/1999 | Binion | |
| 5,983,855 A | 11/1999 | Benedikt et al. | |
| 6,073,607 A | 6/2000 | Liber | |
| 6,076,487 A | 6/2000 | Wulff et al. | |
| 6,260,525 B1 | 7/2001 | Moyer | |
| 6,287,351 B1 | 9/2001 | Wulff et al. | |
| 6,298,838 B1 | 10/2001 | Huff et al. | |
| 6,321,692 B1 | 11/2001 | Rayner | |
| 6,332,448 B1 | 12/2001 | Ilyama et al. | |
| 6,340,015 B1 | 1/2002 | Benedikt et al. | |
| 6,358,180 B1 | 3/2002 | Kuroda et al. | |
| 6,508,233 B1 | 1/2003 | Suhre et al. | |
| 6,513,505 B2 | 2/2003 | Watanabe et al. | |
| 6,536,405 B1 | 3/2003 | Rieger et al. | |
| 6,543,423 B2 | 4/2003 | Dobryden et al. | |
| 6,561,157 B2 | 5/2003 | zur Loye et al. | |
| 6,575,147 B2 * | 6/2003 | Wulff et al. | 123/525 |
| 6,622,663 B2 | 9/2003 | Weissman et al. | |
| 6,668,804 B2 | 12/2003 | Dobryden et al. | |
| 6,725,827 B2 | 4/2004 | Ueda et al. | |
| 6,745,744 B2 | 6/2004 | Suckewer et al. | |
| 6,748,918 B2 | 6/2004 | Rieger et al. | |
| 6,755,175 B1 | 6/2004 | McKay et al. | |
| 6,799,551 B2 | 10/2004 | Nakakita et al. | |
| 6,892,691 B1 | 5/2005 | Uhl et al. | |
| 6,951,202 B2 | 10/2005 | Oda | |
| 6,955,154 B1 | 10/2005 | Douglas | |
| 6,959,693 B2 | 11/2005 | Oda | |
| 6,990,956 B2 | 1/2006 | Niimi | |
| 7,013,847 B2 | 3/2006 | Auer | |
| 7,021,277 B2 | 4/2006 | Kuo et al. | |
| 7,077,100 B2 | 7/2006 | Vogel et al. | |
| 7,107,942 B2 | 9/2006 | Weissman et al. | |
| 7,156,070 B2 | 1/2007 | Strom et al. | |
| 7,188,607 B2 | 3/2007 | Kobayashi | |
| 7,225,787 B2 | 6/2007 | Bromberg et al. | |
| 7,314,033 B2 | 1/2008 | Cohn et al. | |
| 7,320,302 B2 | 1/2008 | Kobayashi | |
| 7,461,628 B2 | 12/2008 | Blumberg et al. | |
| 7,581,528 B2 | 9/2009 | Stein et al. | |
| 2006/0102136 A1 | 5/2006 | Bromberg et al. | |
| 2006/0102145 A1 | 5/2006 | Cohn et al. | |
| 2006/0102146 A1 | 5/2006 | Cohn et al. | |
| 2007/0119391 A1 | 5/2007 | Fried et al. | |
| 2007/0215111 A1 | 9/2007 | Surnilla | |
| 2008/0228382 A1 | 9/2008 | Lewis et al. | |
| 2011/0186011 A1 * | 8/2011 | Kubo et al. | 123/445 |

OTHER PUBLICATIONS

Modak, A. et al., Ermine Cooling by Direct injection of Cooling Water, Society of Automotive Enaineers, Inc., 1970, SAE World Headquarters, Warrendale, PA.

LoRusso, J.A. et al., Direct Injection Ignition Assisted Alcohol Engine, Society of Automotive Engineers, Inc., Feb. 29-Mar. 5, 1998, International Contress and Exposition in Detroit, MI, SAE World Headquarters, Warrendale, PA.

Grandin, B. et al., Knock Suppression in a Turbocharged SI Engine by Using Cooled EGR, Society of Automotive Engineers, Inc., Oct. 19-22, 1998, International Fall Fuels & Lubricants Meeting and Exposition in San Francisco, CA, SAE World Headquarters, Warrendale, PA.

Grandin, B. et al., Replacing Fuel Enrichment in a Turbo Charged SI Engine: Lean Burn or Cooled EGR, Society of Automotive Engineers, Inc., 1999, SAE World Headquarters, Warrendale, PA.

Stan, C. et al., Internal Mixture Formation and Combustion—from Gasoline to Ethanol, Society of Automotive Engineers, Inc., 2001, SAE World Headquarters, Warrendale, PA.

Yuksel et al, The Use of Ethanol-Gasoline Blend as a Fuel in an SI Engine; Renewable Energy, 2004, pp. 1181-1191, Elsevier B.V., Centro, Rio de Janeiro, Brazil.

Heywood, Internal Combustion Engine Fundamentals, 1988, p. 477, McGraw-Hill Book Company, Inc., New York, NY.

Stokes et al, A Gasoline Engine Concept for improved Fuel Economy—The Lean Boost System, Society of Automotive Engineers, Inc., 2001, pp. 1-12, SAE World Headquarters, Warrendale, PA.

Curran et al, A Comprehensive Modeling Study of Iso-Octane Oxidation, Combustion and Flame, 2002, pp. 253-280, Elsevier B.V., Centro, Rio de Janeiro, Brazil.

Lecointe et al, Downsizing a Gasoline Engine Using Turbocharging with Direct Injection, Society of Automotive Engineers, 2003, SAE World Headquarters, Warrendale, PA.

Bromberg, L. et al., Calculations of Knock Suppression in Highly Turbocharged Gasoline/Ethanol Engines Using Direct Ethanol Injection, 2006, pp. 1-17, MIT Laboratory for Energy and the Environment Report, Cambridge, MA.

PCT International Search Report and Written Opinion, Application No. PCT/US08/69171, Oct. 3, 2008.

PCT International Search Report and Written Opinion, Application No. PCT/US07/05777, Mar. 24, 2008.

PCT International Search Report and Written Opinion, Application No. PCT/US07/74227, Feb. 25, 2008.

PCT International Search Report and Written Opinion, Application No. PCT/US05/041317, Apr. 6, 2006.

PCT International Search Report and Written Opinion, Application No. PCT/US06/012750, Jun. 28, 2007.

PCT International Search Report and Written Opinion, Application No. PCT/1807/03004, Jul. 9, 2008.

* cited by examiner

SPARK IGNITION ENGINE THAT USES INTAKE PORT INJECTION OF ALCOHOL TO EXTEND KNOCK LIMITS

This application is a continuation-in-part of U.S. patent application Ser. No. 12/730,662 filed Mar. 24, 2010 which is a continuation of U.S. patent application Ser. No. 11/840,719 filed on Aug. 17, 2007, now U.S. Pat. No. 7,740,004, which is a continuation of U.S. patent application Ser. No. 10/991,774 filed on Nov. 18, 2004, now U.S. Pat. No. 7,314,033, the contents of all of which are incorporated herein by reference.

BACKGROUND OF THE INVENTION

This invention relates to spark ignition engines and more particularly to an engine that uses intake port injection of ethanol to extend knock limits.

By increasing engine compression ratio and downsizing an engine through turbocharging, spark ignited engines significantly improve their fuel consumption. The fundamental limitation in increasing compression ratios and boost pressures is the phenomenon of engine knock. Knock is a phenomenon in which fuel-air mixture in the end gas auto-ignites before the propagating flame consumes it. Heavy knock can create potentially damaging pressure oscillations. Knock occurs at high fuel-air mixture temperatures and pressures and is affected by fuel chemistry. Direct in-cylinder fuel injection (DI) can be used to alleviate the occurrence of knock. This amelioration of knock results because most of the thermal energy required to evaporate the fuel is extracted from the in-cylinder charge, thus cooling it. In port fuel injected (PFI) engines, only a fraction of the fuel's vaporization heat comes from the air as the fuel is largely sprayed onto the hot intake valve and intake port surfaces. The charge cooling effect is more pronounced for fuels with high heat of vaporization such as ethanol. Additionally, even without the charge cooling effect, ethanol is very effective in preventing knock due to its combustion chemistry. The same effects can be obtained with methanol.

U.S. Pat. No. 7,314,033 of which this application is a continuation-in-part through co-pending application Ser. No. 12/730,662 filed Mar. 24, 2010, discloses an engine concept to avoid knock. One principal embodiment disclosed in the U.S. Pat. No. 7,314,033 uses port fuel injection of gasoline. When needed to avoid knock, this embodiment directly injects an antiknock fuel such as ethanol into the cylinders thereby utilizing both the advantageous chemistry of ethanol and its even more pronounced charge cooling effect to prevent knock. Because the antiknock fuel such as ethanol is used only intermittently, the alcohol direct injector, which is exposed to the high temperature gases within the cylinder, requires a robust design. This is because the alcohol direct injector in that embodiment is not continuously cooled by flowing fuel as is a standard direct injector under most operating conditions.

It is an object of the present invention to provide an engine system that does not require a direct injector that is used only intermittently.

SUMMARY OF THE INVENTION

In a first aspect, the invention is an engine system including a source of gasoline for direct injection of the gasoline into the cylinders of a spark ignition engine. A source of an antiknock fuel is provided for injection of the antiknock fuel into the intake ports of the engine as needed to prevent knock. In a preferred embodiment, the antiknock fuel is ethanol. In another embodiment the antiknock fuel is a gasoline/ethanol blend having an ethanol content of 20% by volume or more. Another suitable antiknock fuel is methanol or a methanol/gasoline blend having a methanol content of 15% by volume or more. Yet a further embodiment includes a control system to control injection of the antiknock fuel to prevent knock.

In another aspect, the engine system includes a source of gasoline for injection of the gasoline through a first injector into the intake ports of the engine. A source of an antiknock fuel is provided for injection of the antiknock fuel through a second injector into the intake ports of the engine as needed to prevent knock. As with the earlier aspect, suitable antiknock fuels include ethanol or a gasoline/ethanol blend of 20% by volume or more. Alternatively, methanol or a gasoline/methanol blend having a methanol content of 15% by volume or more can be used as the anti-knock fuel.

In still a further aspect, the invention is an engine system including a source of gasoline, a source of an antiknock fuel, and a fuel control and blending system for receiving the gasoline and the antiknock fuel to deliver gasoline, the antiknock fuel or a gasoline/antiknock fuel blend to an injector for injection into the intake ports of the engine. A control system is provided for controlling the blending system to inject a blend with a selected fraction of the antiknock fuel so as to control knock. Again, suitable antiknock fuels include ethanol and methanol, a gasoline/ethanol blend having an ethanol content of 20% by volume or more and a gasoline/methanol blend having a methanol content of 15% by volume or more.

It has been determined that port fuel injection of the antiknock fuel is highly effective in extending the knock limits.

DESCRIPTION OF THE PREFERRED EMBODIMENT

Figure 1:
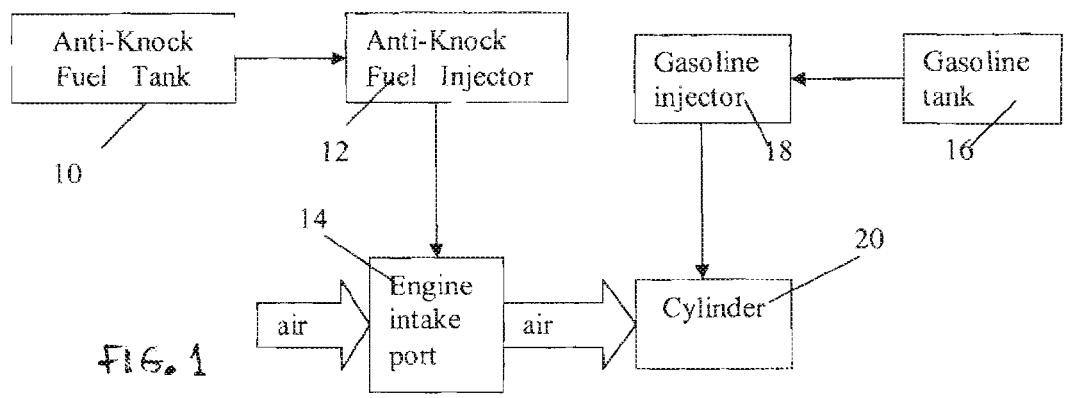
FIG. 1 is a block diagram of an embodiment of the invention that uses intake port injection of an antiknock fuel and direct injection of gasoline.

With reference first to FIG. 1, a source 10 of antiknock fuel, is injected through an injector 12 into an engine intake port 14. A gasoline tank 16 provides gasoline to an injector 18 that directly injects gasoline into a cylinder 20 of a spark ignited engine. In normal operation, the engine runs on gasoline directly injected into the cylinder 20. In order to prevent knock and thus increase engine compression ratio and boost pressures, the antiknock fuel 10 is injected into the engine intake port 14 when needed. A control system (not shown) may be provided to control the injection of the antiknock fuel 10. Although the injector 12 is used only intermittently, it is more reliable because it is subjected to less harsh temperatures because of its location in the engine intake port.

Figure 2:
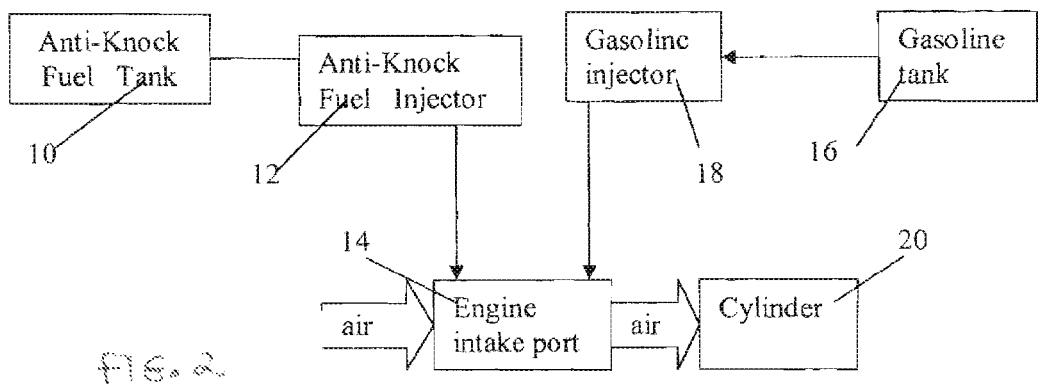
FIG. 2 is a block diagram of an embodiment of the invention in which separate injectors are used for injecting gasoline and an antiknock fuel into the engine intake ports.

Another embodiment of the invention is shown in FIG. 2. In this embodiment, both the antiknock fuel injector 12 and the gasoline injector 18 inject into the engine intake port 14. The arrangement in FIG. 2 has the drawback that the charge cooling benefit of gasoline is not utilized in the regular mode of operation but may reduce the overall cost of the concept set out in FIG. 1.

Figure 3:
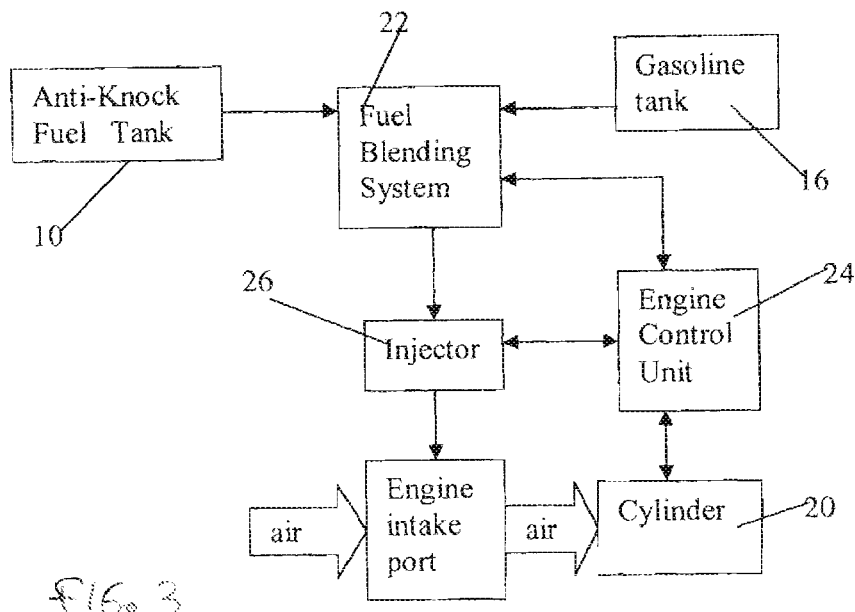
FIG. 3 is a block diagram of an embodiment of the invention in which either gasoline, or antiknock fuel or a blend of gasoline and antiknock fuel are supplied to and then injected through a single injector into the engine intake ports.

Yet another embodiment of the invention is shown in FIG. 3. In this embodiment, a fuel blending system 22 is provided to receive antiknock fuel from the tank 10 and gasoline from the tank 16. The fuel blending system 22 is under the control of an engine control unit 24 that establishes the fraction of antiknock fuel in the blended antiknock fuel/gasoline. This can vary from zero to 100 percent. The blended combination passes through a single injector 26 located in the engine intake port 14. This embodiment still uses two tanks 10 and 16 and the engine control unit 24 determines how much of each of the two fuels to inject.

Port injection of the fuel in all three embodiments of the invention described here could take place either when the intake vale is open or when it is closed as there are benefits to both. Open valve port fuel injection can result in increasing the amount of charge cooling that takes place compared to closed valve port injection and thus be more effective in avoiding knock. However, closed valve injection usually results in better mixing of fuel and air which could also be beneficial.

Figure 4:
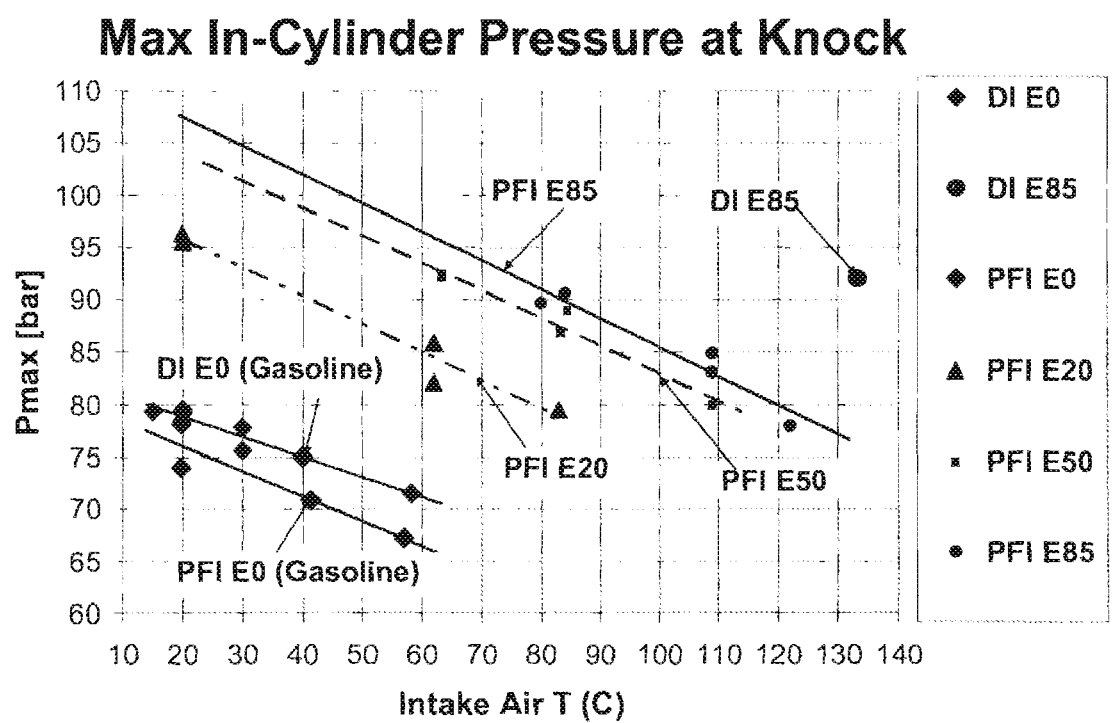
FIG. 4 is a graph of peak cylinder pressure versus intake air temperature at knock onset.

Experiments on the underlying concepts of the engine systems disclosed herein have been conducted at the Sloan Automotive Lab at the Massachusetts Institute of Technology in Cambridge, Mass. Experiments with E85, for example, demonstrated that knock resistance was so high that even in port injection mode, it would be enough to prevent knock in higher compression ratio, heavily boosted engines. FIG. 4 presents data in the form of intake air temperature and peak in-cylinder pressures in which gasoline and E85 (15% gasoline, 85% ethanol) first knock in the PFI and DI modes. The gasoline used for the experiments was high octane, premium gasoline (96 Research Octane Number, 94 Antiknock Index) that contained 0% ethanol (E0).

As seen from the plot in FIG. 4, the pressures and temperatures at which E85 knocks are much higher than for gasoline. By extrapolating the line that connects the points where E85 knocks in the port fuel injection mode to reasonable air intake temperatures (up to 35-40° C.), the pressures required to get the engine to knock are higher than 100 bar. Therefore it is plausible that with ethanol use, the compression ratio of the engine can be significantly increased without knock even if the ethanol is port injected. In the same plot, data for PFI injection of E50 are presented as well. It can clearly be observed that E50 (50% gasoline, 50% ethanol) can also be very effective, almost as effective as E85 in pushing the knock boundaries to temperatures and pressures much higher than gasoline.

It should be mentioned that the embodiments of the invention described above are not exclusively limited to E85 as the antiknock agent. E50 also had excellent anti-knock performance as displayed in the data of FIG. 4. Even E20 had much better anti-knock characteristics compared to gasoline as displayed in the data of FIG. 4. The invention described herein could be realized with E85 and with lower ethanol content blends. Furthermore, the invention concept could be realized with simultaneous injection of gasoline and a high ethanol content blend in order to achieve the average ethanol fuel content needed to avoid knock.

Another suitable antiknock fuel is methanol. Methanol has a higher ratio of heat of vaporization to heating value than ethanol. Also, blends of ethanol and methanol could be used as the antiknock fuel. The data in FIG. 4 indicates that these fuels, with higher ratio of heat of vaporization to heating value than ethanol, would perform better than ethanol at the percentages shown in FIG. 4

It is recognized that modifications and variations of the inventions disclosed herein will be apparent to those of ordinary skill in the art and it is intended that all such modifications and variations be included within the scope of the appended claims.

What is claimed is:

1. An engine system comprising:
    a source of gasoline and means for direct injection of the gasoline into at least one cylinder of a spark ignition engine; and
    a source of an antiknock fuel and means for injection of the antiknock fuel into at least one intake port of the engine as needed to prevent knock.

2. The engine system of claim 1 wherein the antiknock fuel is ethanol.

3. The engine system of claim 1 wherein the antiknock fuel is a gasoline/ethanol blend having an ethanol content of 20% by volume or more.

4. The engine system of claim 1 wherein the antiknock fuel is methanol.

5. The engine system of claim 1 wherein the antiknock fuel is a gasoline/methanol blend having a methanol content of more than 15% by volume.

6. The engine system of claim 1 wherein the antiknock fuel is an ethanol/methanol blend.

7. The engine system of claim 1 further including a control system to control injection of the antiknock fuel to prevent knock, 8. An engine system comprising:
    a source of gasoline and means for injection of the gasoline through a first injector into at least one intake port of the engine; and
    a source of an antiknock fuel and means for injection of the antiknock fuel through a second injector into the intake ports of the engine as needed to prevent knock.

9. The engine system of claim 8 wherein the antiknock fuel is ethanol.

10. The engine system of claim 8 wherein the antiknock fuel is a gasoline/ethanol blend having an ethanol content of 20% by volume or more.

11. The engine system of claim 8 wherein the antiknock fuel is methanol.

12. The engine system of claim 8 wherein the antiknock fuel is a gasoline/methanol blend having a methanol content of more than 15% by volume.

13. The engine system of claim 8 wherein the antiknock fuel is an ethanol/methanol blend.

14. The engine system of claim 8 further including a control system to control injection of the antiknock fuel to prevent knock.

15. An engine system comprising:
    a source of gasoline;
    a source of an antiknock fuel;
    a fuel blending system including means for receiving the gasoline and the antiknock fuel to deliver the gasoline, the antiknock fuel or a gasoline/antiknock blend to an injector for injection of these fuels into at least one intake port of the engine; and
    a control system including means for controlling the blending system to inject a blend with a selected fraction of the antiknock fuel to control knock.

16. The engine system of claim 15 wherein the antiknock fuel is ethanol.

17. The engine system of claim 15 wherein the antiknock fuel is a gasoline/ethanol blend having an ethanol content of 20% by volume or more.

18. The engine system of claim 15 wherein the antiknock fuel is methanol.

19. The engine system of claim 15 wherein the antiknock fuel is an ethanol/methanol blend.

20. The engine system of claim 15 wherein the antiknock fuel is a gasoline/methanol blend having a methanol content of more than 15% by volume.

21. The engine system of claim 1, claim 8 or claim 15 wherein the antiknock fuel and the gasoline are injected simultaneously in order to achieve an average antiknock fuel content needed to avoid knock.

* * * * *